UNITED STATES PATENT OFFICE.

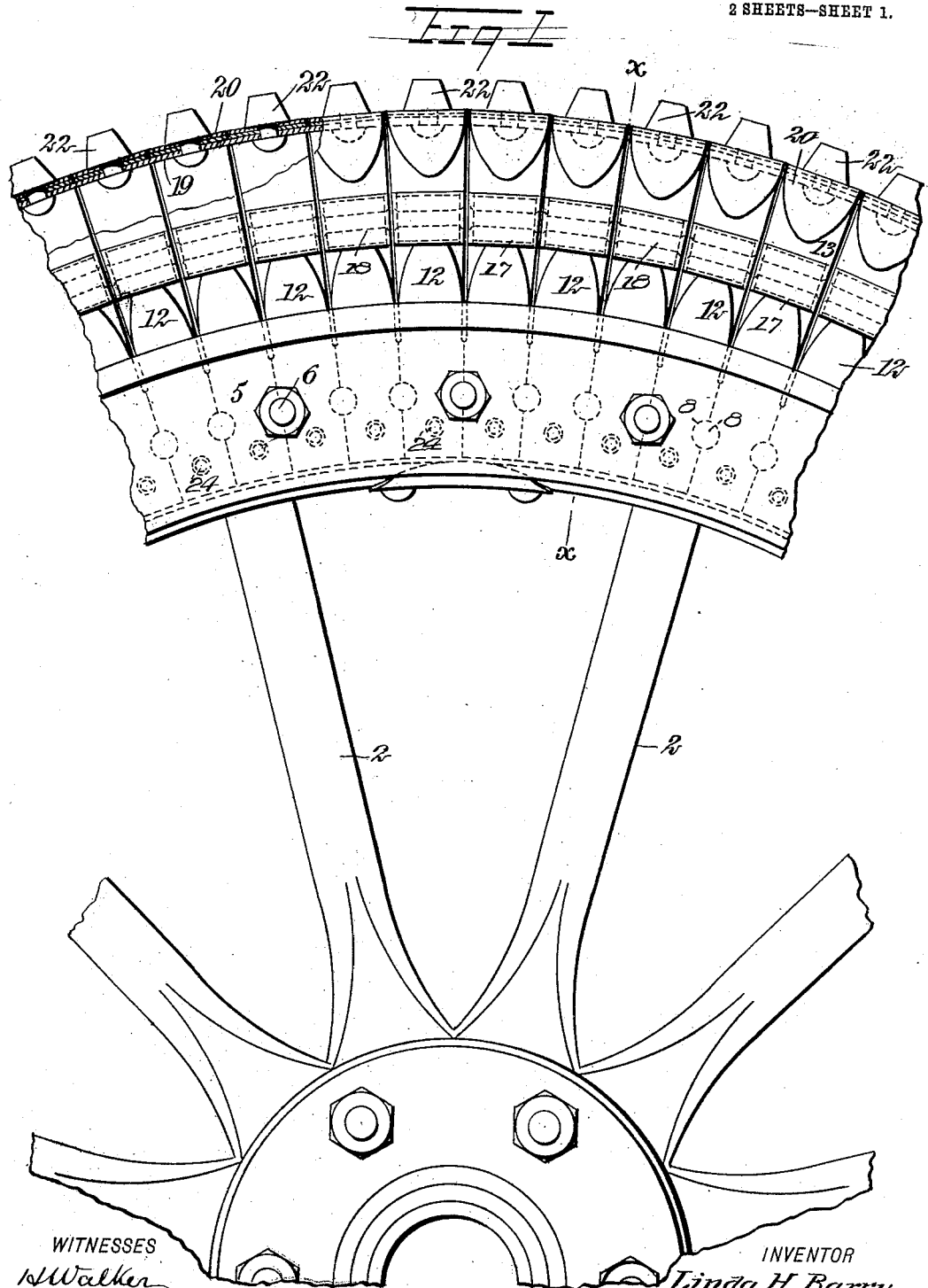

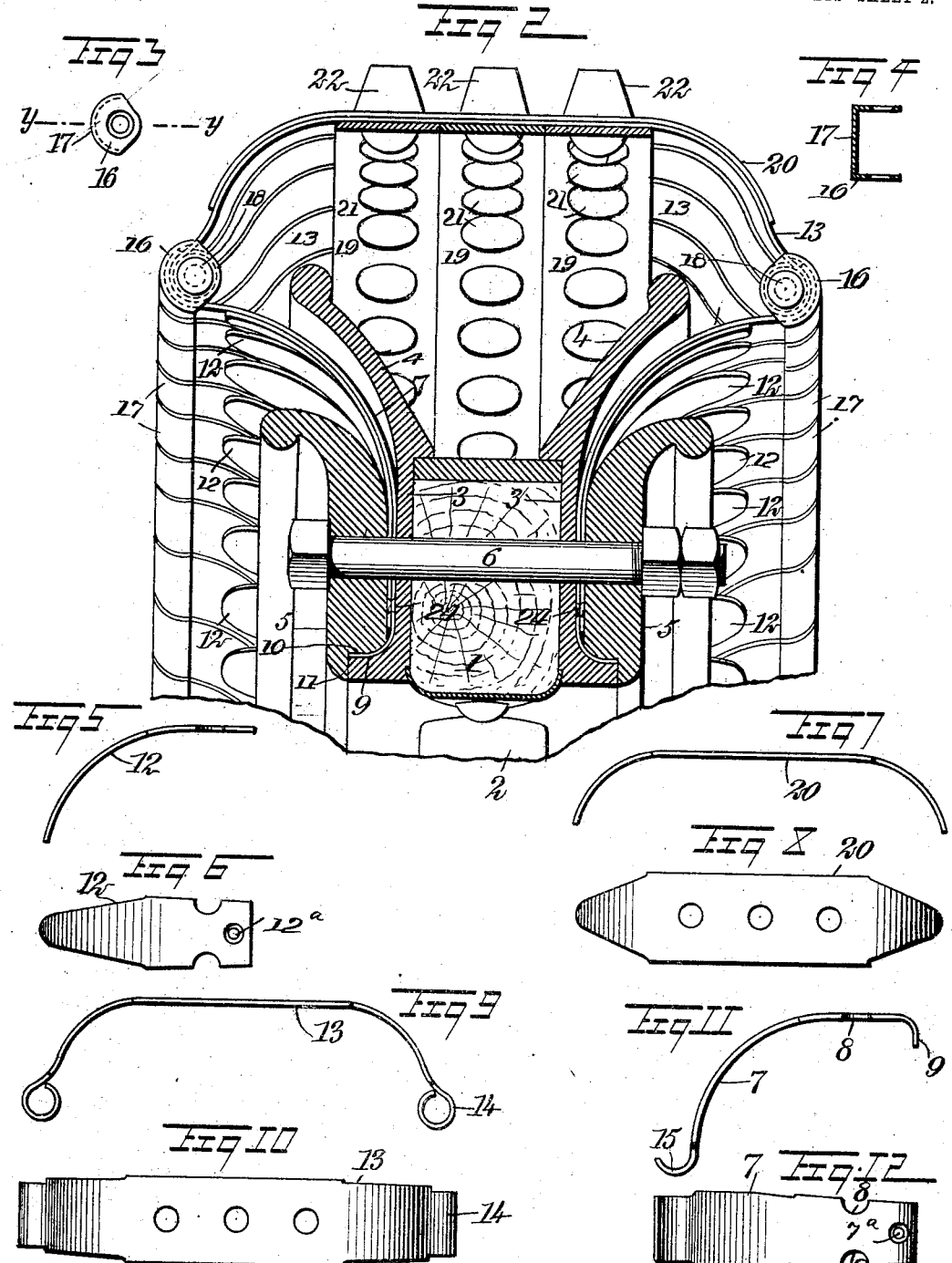

LINDA HENRY BARRY, OF DURANGO, MEXICO.

VEHICLE-WHEEL.

No. 895,941.

Specification of Letters Patent.

Patented Aug. 11, 1908.

Application filed October 10, 1906. Serial No. 338,263.

*To all whom it may concern:*

Be it known that I, LINDA H. BARRY, a citizen of the United States, and a resident of Durango, Mexico, have invented a new and Improved Vehicle-Wheel, of which the following is a full, clear, and exact description.

This invention relates to improvements in vehicle wheels of the class having metal spring tires, the object being to provide a wheel of this character that will be comparatively light, yet strong and serviceable, and that will meet all the requirements of a cushioned tire.

I will describe a vehicle wheel embodying my invention and then point out the novel features in the appended claims.

Reference is to be had to the accompanying drawings forming a part of this specification, in which similar characters of reference indicate corresponding parts in all the figures.

Figure 1 is a side elevation of a portion of a vehicle wheel embodying my invention; Fig. 2 is a section on the line $x$—$x$ of Fig. 1; Fig. 3 is an end view of a coupling clip employed; Fig. 4 is a section on the line $y$—$y$ of Fig. 3; and Figs. 5 to 12 inclusive are detailed views of various parts employed in the tire construction, as will be fully described.

Referring to the drawings, 1 designates the wooden rim of a wheel to which spokes 2 are attached in any suitable manner, and engaging with the sides of the rim 1 are metal rings 3 having upwardly flared portions 4; and outward of these rings 3 are supplemental metal rings 5 which are also flared outward. Passing through the said rings and also through the rim 1 are clamping bolts 6, and these rings in practice form clamping members for a plurality of longitudinally curved springs 7 which are provided with notches 8 at the sides for receiving the clamping bolts. The inner ends of these spring members are curved outward as indicated at 9 to engage between shoulders 10 and 11 of the rings, as clearly indicated in Fig., 2. Also clamped between said rings and engaging against the outer sides of the members 7 are supplemental springs 12 which are also provided at the sides with notches for receiving the clamping bolts. Each curved spring 7 has a hole $7^a$ near its inner end and there is a similar hole $12^a$ formed in each auxiliary or supplemental spring 12, as indicated respectively in Figs. 12 and 6, for receiving rivets 24 that unite each pair of these springs, as indicated in Figs. 1 and 2.

The tread of the tire comprises a plurality of longitudinally curved strips 13 of spring metal, the ends thereof being coiled as indicated at 14, and with these coiled ends the hook ends 15 of the spring members 7 are designed to engage. The said spring members 7 are spaced slightly apart as are also the tread members 13, and engaging with the coils 14 are the end members 16 of coupling clips 17. The end walls of said clips are perforated and the walls of the perforations are counter-sunk to receive the heads of fastening rivets 18, which pass through both end members 16 of the coupling clips 17 and through the coiled ends 14 of the tread members 13, said coiled ends being received between the said members 16. The curved end 15 of each spring 7 is received between a coiled end 14 of a tread member and the inner surface of the clip 17, so that the clip and rivet effect the desired coupling between the spring member 7 and the tread member 13.

Extending around the inner side of the tread members 13 are bands 19 of spring metal, and extending over each tread member 13 and lengthwise thereof is a supplemental tread member 20, the said tread members and the bands being secured together by rivets 21 which at the outer end are in the form of lugs or projections 22 which will serve to prevent skidding of the wheel.

Having thus described my invention I claim as new and desire to secure by Letters Patent:—

1. A vehicle wheel, comprising a rim, a plurality of longitudinally curved spring members clamped to the rim and formed with upwardly and inwardly-curved ends, a plurality of longitudinally curved springs forming tread members, the outer ends of which are curved downwardly and inwardly and are overlapped by the curved ends of the first named springs, clips having side flanges between which the curved ends of the respective spring members are received, and means for uniting the clips to said curved members.

2. A vehicle wheel, comprising a rim, a plurality of upwardly and outwardly curved spring members, a pair of upwardly and outwardly flaring rings at each side of the rim, said rings serving to clamp said spring members between them, said spring members having upwardly and inwardly curved ends, a plurality of spring tread members ranging transversely of the wheel and curved in the direction of their length, the ends of said tread members being coiled and being received within the hooked ends of the first named springs, and bands extending around the wheel and secured to the tread members.

3. A vehicle wheel, comprising a rim, a plurality of longitudinally curved spring members clamped to the rim, auxiliary spring members also clamped to the rim, and extending beneath the first mentioned spring members to reinforce the same, and spring-yielding longitudinally curved tread members having rocking engagement at the ends with the first-named spring members.

4. A vehicle wheel, comprising a rim, outwardly-curved spring members, pairs of outwardly-curved rings extending around the rim at the sides, each pair of rings forming an outwardly flaring space therebetween, between which the said spring members are clamped, and spring tread members secured to the first mentioned spring members at their respective ends.

5. A vehicle wheel comprising a rim, a pair of clamping rings at each side of the rim, clamping bolts passing through the rings and rim, the said rings being flared outward from the periphery of the rim, a plurality of longitudinally curved spring members clamped between the pairs of rings, and spring-yielding tread members engaging the said outwardly-curved spring members.

In testimony whereof I have signed my name to this specification in the presence of two subscribing witnesses.

LINDA HENRY BARRY.

Witnesses:
JAMES A. LE ROY,
L. D. BARRY.